(12) United States Patent
Ito (10) Patent No.: US 8,601,037 B2
(45) Date of Patent: Dec. 3, 2013

(54) DATA STORAGE SYSTEM, DATA STORAGE APPARATUS, AND COMPUTER READABLE MEDIUM

(75) Inventor: Takashi Ito, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 216 days.

(21) Appl. No.: 12/391,195

(22) Filed: Feb. 23, 2009

(65) Prior Publication Data

US 2009/0240749 A1 Sep. 24, 2009

(30) Foreign Application Priority Data

Mar. 21, 2008 (JP) ................................. 2008-073231

(51) Int. Cl.
*G06F 17/30* (2006.01)
(52) U.S. Cl.
CPC ............................. *G06F 17/30017* (2013.01)
USPC ........................................................ 707/822
(58) Field of Classification Search
USPC ........... 707/600–831, 999.205; 709/217–219; 215/234, 242, 253, 277
See application file for complete search history.

(56) References Cited

U.S. PATENT DOCUMENTS

| | | |
|---|---|---|
| 5,832,470 A | 11/1998 | Morita et al. |
| 7,003,442 B1 | 2/2006 | Tsuda |
| 7,865,476 B2 * | 1/2011 | Kodama ......................... 707/674 |
| 7,930,168 B2 * | 4/2011 | Weng et al. ........................ 704/9 |
| 2002/0049789 A1 * | 4/2002 | Frolich et al. .................. 707/513 |
| 2005/0110879 A1 | 5/2005 | Izume et al. |
| 2007/0288704 A1 | 12/2007 | Mizuno |

FOREIGN PATENT DOCUMENTS

| | | |
|---|---|---|
| JP | H08-153121 A | 6/1996 |
| JP | 2000-010996 A | 1/2000 |
| JP | 2002-024067 A | 1/2002 |
| JP | 2004-228944 A | 8/2004 |
| JP | 2005-157615 A | 6/2005 |
| JP | 2005-309979 A | 11/2005 |
| JP | 2006-262214 A | 9/2006 |
| JP | 2007-304773 A | 11/2007 |
| JP | 2007-329663 A | 12/2007 |
| JP | 2008-004144 A | 1/2008 |

OTHER PUBLICATIONS

Harumasa Tada, et al., A File Naming Scheme using Hierarchical-Keywords, 2002, IEEE, 6 pages.*
Japan Patent Office, Notification of Reason for Refusal in counterpart Patent Application No. JP 2008-073231, mailed Jun. 29, 2010.

* cited by examiner

*Primary Examiner* — Jean B Fleurantin
(74) *Attorney, Agent, or Firm* — Baker Botts L.L.P.

(57) ABSTRACT

A data storage system, apparatus, and computer readable medium are provided. The data storage system includes a storage which stores keywords including a character; data file receiver which receives a data file; a keyword specifier that specifies a keyword group including a keyword that is commonly included in both the keywords and the data file; a display which outputs the keyword group; a selector which selects a keyword from the keyword group; and data file storage which stores the data file in a folder whose folder name is generated based on the selected keyword.

17 Claims, 6 Drawing Sheets

DATA STORAGE SYSTEM, DATA STORAGE APPARATUS, AND COMPUTER READABLE MEDIUM

CROSS-REFERENCE TO RELATED APPLICATIONS

This application claims priority from Japanese Patent Application No. 2008-073231 filed on Mar. 21, 2008, the entire contents of which are incorporated herein by reference.

TECHNICAL FIELD

Apparatuses and computer readable media consistent with the present invention relate to a data storage and storing data files in a folder.

BACKGROUND

Related art data storage techniques store data files in a folder using a hierarchical structure of folder and file. Various types of related art data storage techniques exist. For example, as described in JP-A-2007-329663, there is a type in which candidates of a folder having input data files stored therein are output, and data files are stored in a folder selected by a user from the output candidates. In the related art data storage technique described in JP-A-2007-329663, history information includes a folder name of a storage destination, in which data files input in the past have been stored, and a storage date, etc. When a data file is input, a priority order is attached to respective folders, based on the history information. Folder names and storage dates, etc. are displayed, in the higher priority order, and a data file is stored in a folder selected by the user from the folders displayed.

There are many cases in which a user decides for himself or herself a folder name for a folder which is associated with the content of the data file, and the user stores the data file in the folder that the user creates. By doing so, the user is able to easily infer the content of the data files stored in the folder by only looking at the folder name. As a result, the user can easily retrieve a desired data file using the folder name as a key when the user wants to use a data file.

As described above, the related art data storage techniques provide a user with system generated folder candidates that become the storage destination of a data file. However, the folder candidates are not specified based on the content of the data files stored therein. That is, the related art data storage techniques have a disadvantage in that it is not possible to provide a user with folder name candidates associated with the content of the data files stored therein.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an aspect of the present invention to provide a data storage apparatus and computer readable medium by which a folder name associated with the content of the data files stored therein can be provided a candidate for the storage destination of a data file.

According to an illustrative aspect of the present invention, there is provided a data storage system comprising a keyword storing unit configured to store a plurality of keywords including a character; a data file inputting unit configured to input a data file; a keyword specifying unit configured to specify a keyword group including a keyword that is commonly included in both the plurality of keywords and the data file; a keyword outputting unit configured to output the keyword group specified by the keyword specifying unit; a keyword selection unit configured to select a keyword from the keyword group; and a data file storing unit configured to store the data file in a folder whose folder name is generated based on the keyword selected by the keyword selection unit.

According to another illustrative aspect of the present invention, there is provided a computer readable medium storing a computer program which, when executed, performs: a data file inputting process for inputting a data file; a keyword specifying process for specifying a keyword group including a keyword that is commonly included in both of a plurality of keywords and the data file; a keyword outputting process for outputting the keyword group specified by the keyword specifying process; and a data file storing process for storing the data file in a folder, whose folder name is generated based on a keyword selected from the keyword group.

According to another exemplary embodiment of the present invention, there is provided a data storage apparatus comprising a hard drive which stores a plurality of keywords including a character; an input apparatus which is configured to input a data file; and a controller which is configured to: specify a keyword group including a keyword that is commonly included in both the plurality of keywords and the data file; select a keyword from the keyword group; and store the data file in a folder whose folder name is generated based on the keyword that is selected.

DESCRIPTION OF EXEMPLARY EMBODIMENTS OF THE PRESENT INVENTION

Figure 1:
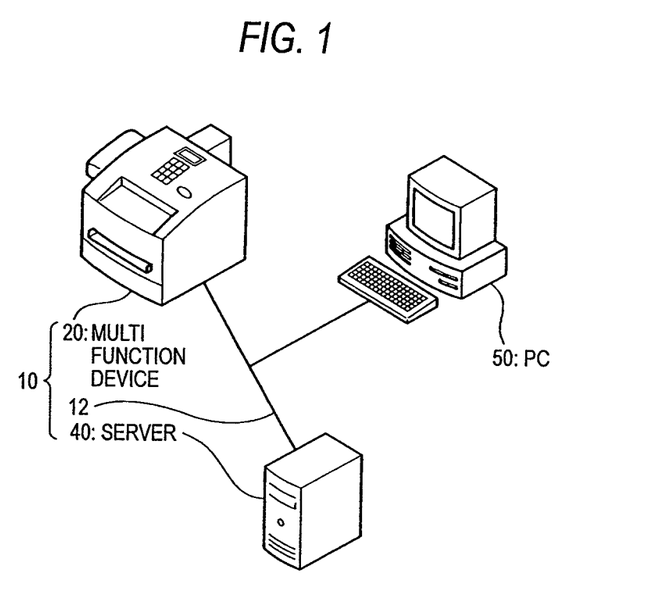
FIG. 1 is a schematic view showing a data storage system according to an exemplary embodiment of the present invention.

A description will now be given of exemplary embodiments of the present invention with reference to the drawings. FIG. 1 briefly shows a configuration of a data storage system 10 according to an exemplary embodiment of the present invention. The data storage system 10 includes a multi function device 20 and a server 40, wherein the multi function device 20 and the server 40 are separately composed. The multi function device 20 and the server 40 are connected to each other so as to communicate with each other via a network line 12 such as a LAN cable or a wirelessly connected via a wireless connection, etc. A personal computer 50 (PC 50) is connected to the data storage system 10 so as to communicate therewith via the network line 12 or is connected wirelessly. In addition, there is no restriction to the number of personal computers connected to the data storage system 10. Furthermore, any multi function device other than the PC may be connected thereto so as to communicate therewith.

(Configuration of Multi Function Device)

Figure 2:
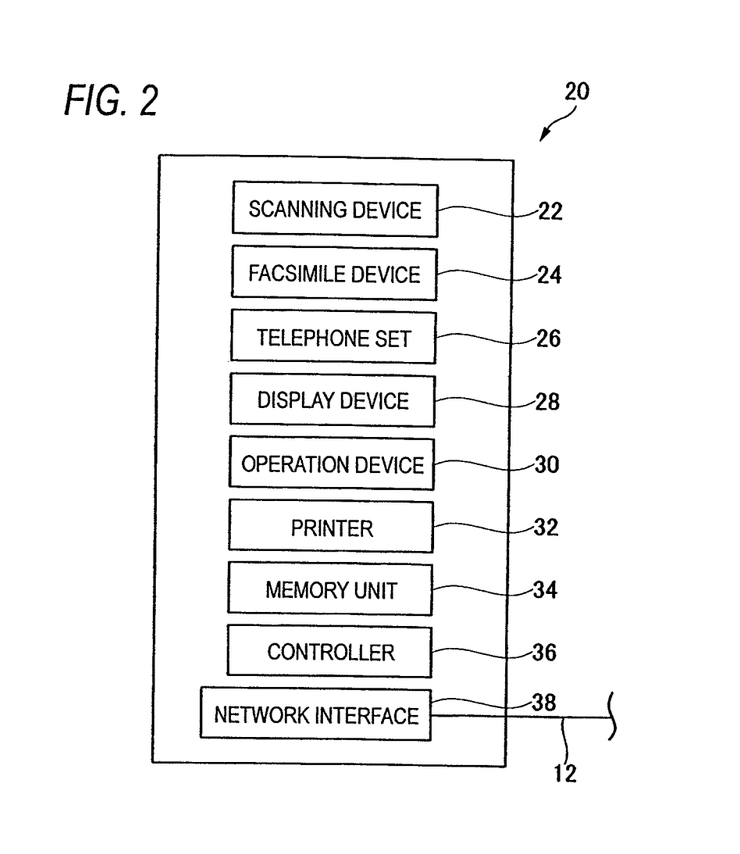
FIG. 2 is a view showing an exemplary configuration of a multi function device of the data storage system of FIG. 1.

FIG. 2 shows an exemplary configuration of the multi function device 20 according to an exemplary embodiment of the present invention. The multi function device 20 includes a scanning device 22, a facsimile device 24, a telephone set 26, a display device 28, an operation device 30, a printer 32, a memory unit 34, a controller 36, and a network interface 38. The scanning device 22 scans an object to be scanned, which is set in the scanning device 22, and prepares image data. The facsimile device 24 receives FAX data transmitted from a peripheral facsimile device. The facsimile device 24 can receive tag information, if the fax number of the facsimile device of the transmission source, transmission date and time, and name of the transmission source, etc., are added to the transmitted FAX data as tag information. The telephone set 26 receives a call from a peripheral telephone set. The telephone set 26 can receive the telephone number of the telephone set at the receiving side as tag information. The display device 28 displays various types of information. The operation device 30 has a plurality of keys (for example, ten keys, start key, cancellation key, and retrieval key, etc.). Various types of information and instructions may be input into the multi function device 20 by operating the operation device 30. The printer 32 prints on a printing medium based on printing data. The printing data may be transmitted from a peripheral device (for example, PC 50) which is connected to the multi function device 20. In addition, the printing data may be data that the scanning device 22 prepares or data that the facsimile device 24 receives.

A network line 12 is connected to the network interface 38. The multi function device 20 communicates with a server 40 via the network interface 38. In addition, the network line 12 is connected to the PC 50 via, for example, a hub and a router, etc. The multi function device 20 also communicates with the PC 50 via the network interface 38. The PC 50 transmits data files to the multi function device 20. For example, the PC 50 may transmit data files as an electronic mail or may transmit data files by using Hyper Text Transfer Protocol (HTTP), Web Distributed Authoring and Versioning Protocol (WebDAV), etc. Therefore, the multi function device 20 may input data files. In addition, data files input in the multi function device 20 include image data prepared by the scanning device 22, FAX data received by the facsimile device 24, and sound data received by the telephone set 26. These data are not added to a file name as the data is being input in the multi function device 20. The controller 36 described later may automatically determine a file name or may determine the file name based on information input by a user.

The memory unit 34 stores various types of information. The memory unit 34 stores a communication port that is used for communication with the server 40. The controller 36 executes various processes in compliance with programs and controls the operations of the multi function device 20. The controller 36 causes the memory unit 34 to store information of input date and time when data files are input in the multi function device 20. In addition, the controller 36 executes processing in either one of a first mode or a second mode in a case in which data files are input in the multi function device 20. The first mode and the second mode may be switched by operating the operation device 30. The processing executed by the controller 36 will be described in detail later.

(Configuration of Server)

Figure 3:
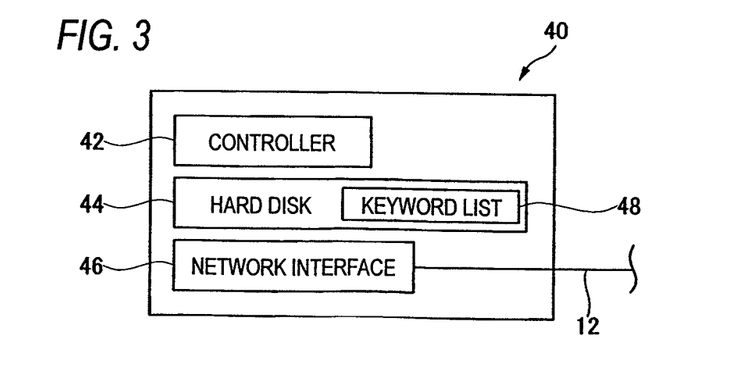
FIG. 3 is a view showing a configuration of a server of the data storage system of FIG. 1.

FIG. 3 shows a configuration of the server 40. The server 40 includes a controller 42, a hard disk 44 and a network interface 46. The controller 42 executes various processes in compliance with programs and controls the operation of the server 40. The processing executed by the controller 42 will be described in detail later. The hard disk 44 stores various types of information. The hard disk 44 stores programs for the controller 42 to control the operation of the server 40. In addition, the hard disk 44 stores a keyword list 48. A plurality of keywords input by a user in advance are stored in the keyword list 48. Further, the hard disk 44 can store data files by using a hierarchical structure of folders and files. Furthermore, the hard disk 44 includes a non-classified folder in which data files for which no folder is designated are stored.

The network line 12 is connected to the network interface 46. The server 40 can communicate with the multi function device 20 via the network interface 46. Additionally, the server 40 can communicate with the PC 50 via the network interface 46. The server 40 receives various requests from the PC 50 via the network interface 46. The controller 42 transmits a list of folders or data files to the PC 50 in accordance with a request from the PC 50. Data files stored in the hard disk 44 may be retrieved or monitored using the PC 50. Further, keywords may be caused to be stored in the keyword list 48 of the server 40 by using the PC 50.

(Processing of Multi Function Device)

Figure 4:
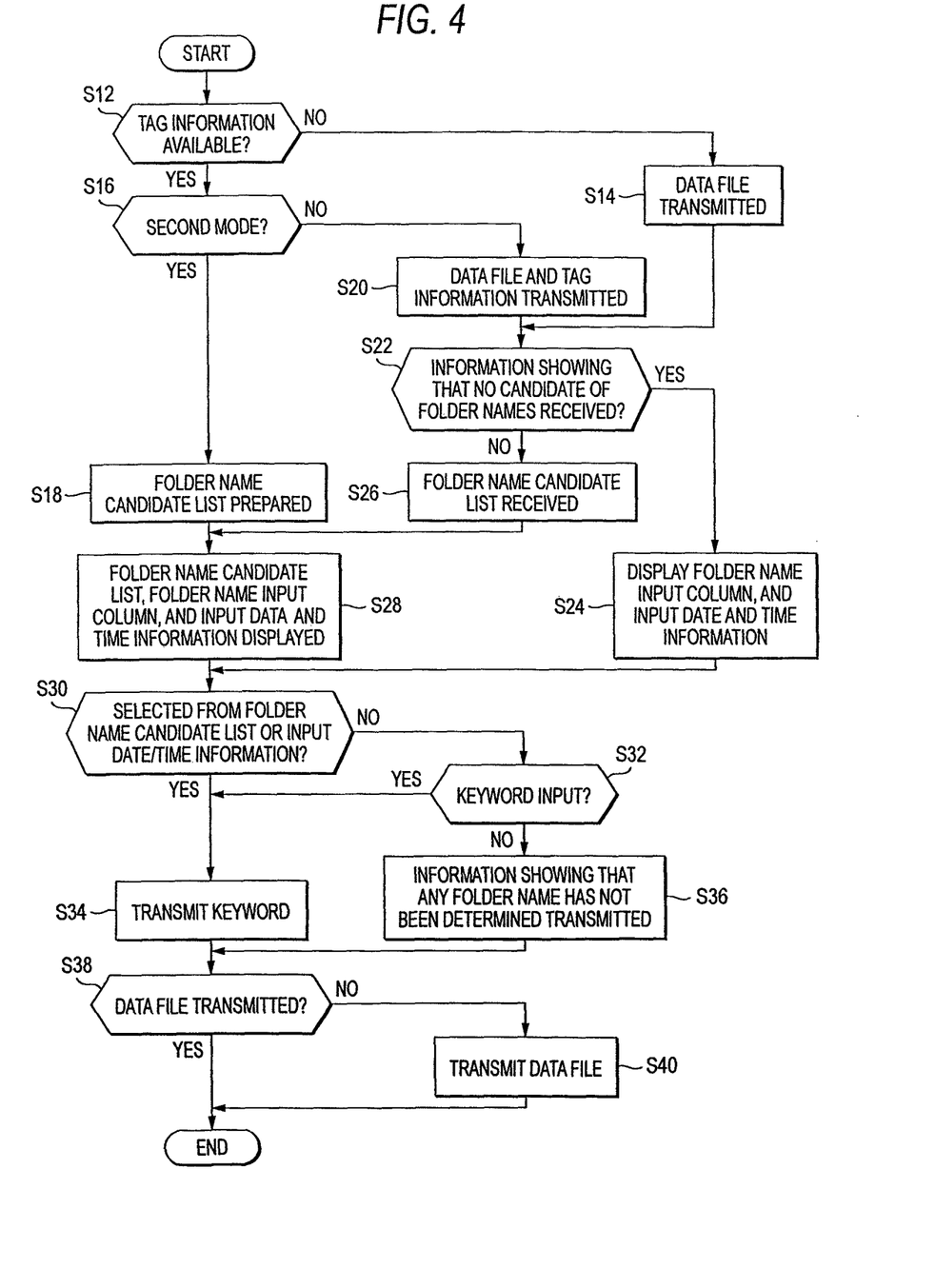
FIG. 4 is a flowchart showing a process that is executed by a controller of the multi function device of FIG. 2 when a data file is stored in the data storage system.

FIG. 4 is a flowchart showing a processing sequence of the controller 36 of the multi function device 20 in a case in which data files input in the multi function device 20 are stored in the hard disk 44 of the server 40. As a data file is input in the multi function device 20, the process is commenced. The controller 36 checks to see whether any tag information is appended to the input data file (S12). If no tag information is appended (NO in S12), the controller 36 transmits the input data file to the server 40 (S14), and advances to operation S22. On the other hand, if tag information is appended (YES in S12), the controller 36 determines whether the second mode is set (S16). If the second mode is set (YES in S16), the controller 36 prepares a candidate list of folder names according to the tag information without transmitting the input data file to the server 40 (S18). For example, if the tag information includes only information regarding the transmission date and time, the controller 36 prepares a candidate list of folder names including the information of transmission date and time. In this case, only one name becomes a candidate of the folder name. As another example, if the tag information includes a plurality of types of information (for example, information of transmission date and time, and information on the subject), the controller 36 prepares a candidate list of folder names including the respective information. In this case, a plurality of names are made into folder name candidates. Once operation S18 is complete, the processing advances to S28. On the other hand, if the first mode is set (NO in S16), the controller 36 transmits the input data file and tag information to the server 40 (S20), and advances to operation S22.

After the data file is transmitted to the server 40 in either operation S14 or operation S20, the controller 36 monitors information from the server 40 and determines if information is received showing that no folder name candidates exist (S22). If the controller 36 receives information from the server 40 showing that there is no folder name candidate (YES in S22), the controller 36 displays an input for a folder name and information regarding an input date and time, which is stored in the memory unit 34 (S24), on the display device 28 and advances to operation S30. If the controller 36 receives a candidate list of folder names (S26) (NO in S22), the controller 36 displays the candidate list of folder names, an input column for the folder name, and information on an input date and time, which is stored in the memory unit 34, on the display device 28 (S28). A keyword from the candidate list of folder names displayed on the display device 28 or information on the input date and time is then selected by operating the operation device 30. Alternatively, a keyword in the input column for the folder name may be input by controlling the operation device 30. The controller 36 monitors whether a keyword is selected (S30). If the keyword is selected (YES in S30), the controller 36 advances to operation S34.

On the other hand, if no keyword has been selected from the candidate list of folder names (NO in S30), the controller 36 checks whether a keyword has been input in the input column for the folder name (S32). If a keyword has been input (YES in S32), the controller 36 advances to operation S34. At operation S34, the controller 36 transmits the keyword selected in operation S30 or the keyword input in operation S32 to the server 40, and advances to operation S38. On the other hand, if no keyword has been input in the input column for the folder name (NO in S32), the controller 36 transmits information to the server 40 showing that the folder name has not been determined (S36), and advances to operation S38. At operation S38, the controller 36 checks whether a data file has been transmitted to the server 40. If the data file has already been transmitted to the server 40 (YES in S38), the controller 36 terminates processing. On the other hand, if no data file has been transmitted to the server 40 (NO in S38), the controller 36 transmits a data file to the server 40 and terminates the processing.

(Processing of Server)

Figure 5:
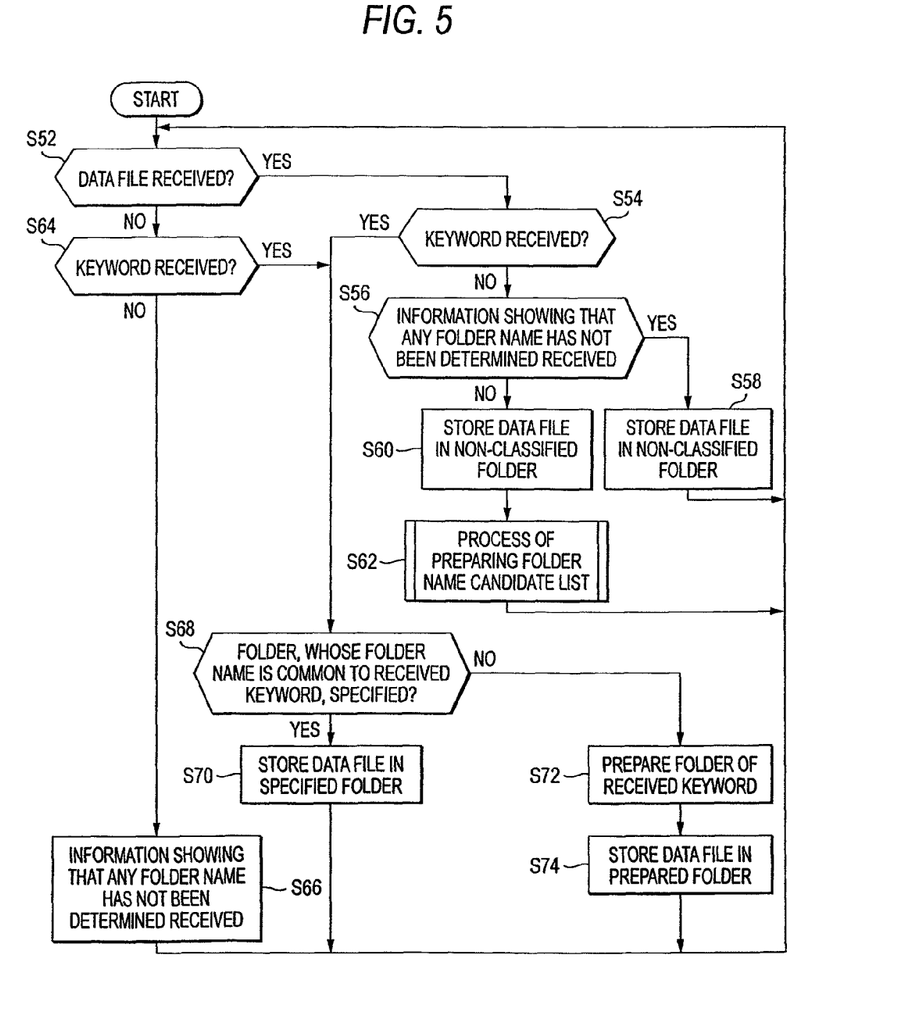
FIG. 5 is a flowchart showing a process that is executed by a controller of the server of FIG. 3 when a data file is stored in the data storage system.

FIG. 5 is a flowchart showing a processing sequence of the controller 42 in a case in which the server 40 stores the data file received from the multi function device 20 in a folder. The controller 42 determines whether a data file transmitted from the multi function device 20 has been received (S52). If no data file is received from the multi function device 20 (NO in S52), processing proceeds to operation S64. If the data file is received from the multi function device 20 (YES in S52), the controller 42 checks whether a keyword is received from the multi function device 20 (S54). If no keyword has been received (NO in S54), the controller 42 checks whether information has been received from the multi function device 20 showing that no folder name has been determined (S56). If information showing that no folder name has been determined is received (YES in S56), the controller 42 stores the data file received in operation S52 in the non-classified folder (S58) and returns to operation S52. On the other hand, if information showing that no folder name has been determined has not been received (NO in S56), the controller 42 stores the data file received in S52 in the non-classified folder (S60). The controller 42 executes a process for preparing a candidate list of folder names with respect to the data file stored in the non-classified folder (S62). The processing for preparing a candidate list of folder names will be described in detail later. On the other hand, if a keyword is received along with the data file (YES in S54), the process advances to operation S68.

At operation S64, the controller 42 determines whether a keyword transmitted from the multi function device 20 is received. If the controller 42 determines that no keyword is received from the multi function device 20, the controller 42 returns processing to operation S52. That is, if no keyword is received and no data file is received (NO in S52 and NO in S64), processing returns to operation S52. On the other hand, if the controller 42 determines that a keyword is received (YES in S64), the controller 42 advances to operation S68. That is, if no data file is received but a keyword is received (NO in S52 but YES in S64), processing continues to operation S68.

At operation S68, the controller 42 determines whether a folder, the folder name of which is common to the received keyword, in the hard disk 44 is specified. If a folder having a common folder name has been specified (YES in S68), the controller 42 stores the data file, which is stored in the non-classified folder in S60, in the specified folder (S70), and returns to operation S52. On the other hand, if a folder having a common folder name has not been specified (NO in S68), the controller 42 newly prepares a folder of the received folder name in the hard disk 44 (S72). The controller 42 stores the data file, which is stored in the non-classified folder in S60, in the newly prepared folder (S74). The controller 42 registers the folder name of a folder to be newly prepared in the hard disk 44, in the keyword list 48 (S76), and returns to operation S52.

(Process of Preparing a Candidate List of Folder Names)

Figure 6:
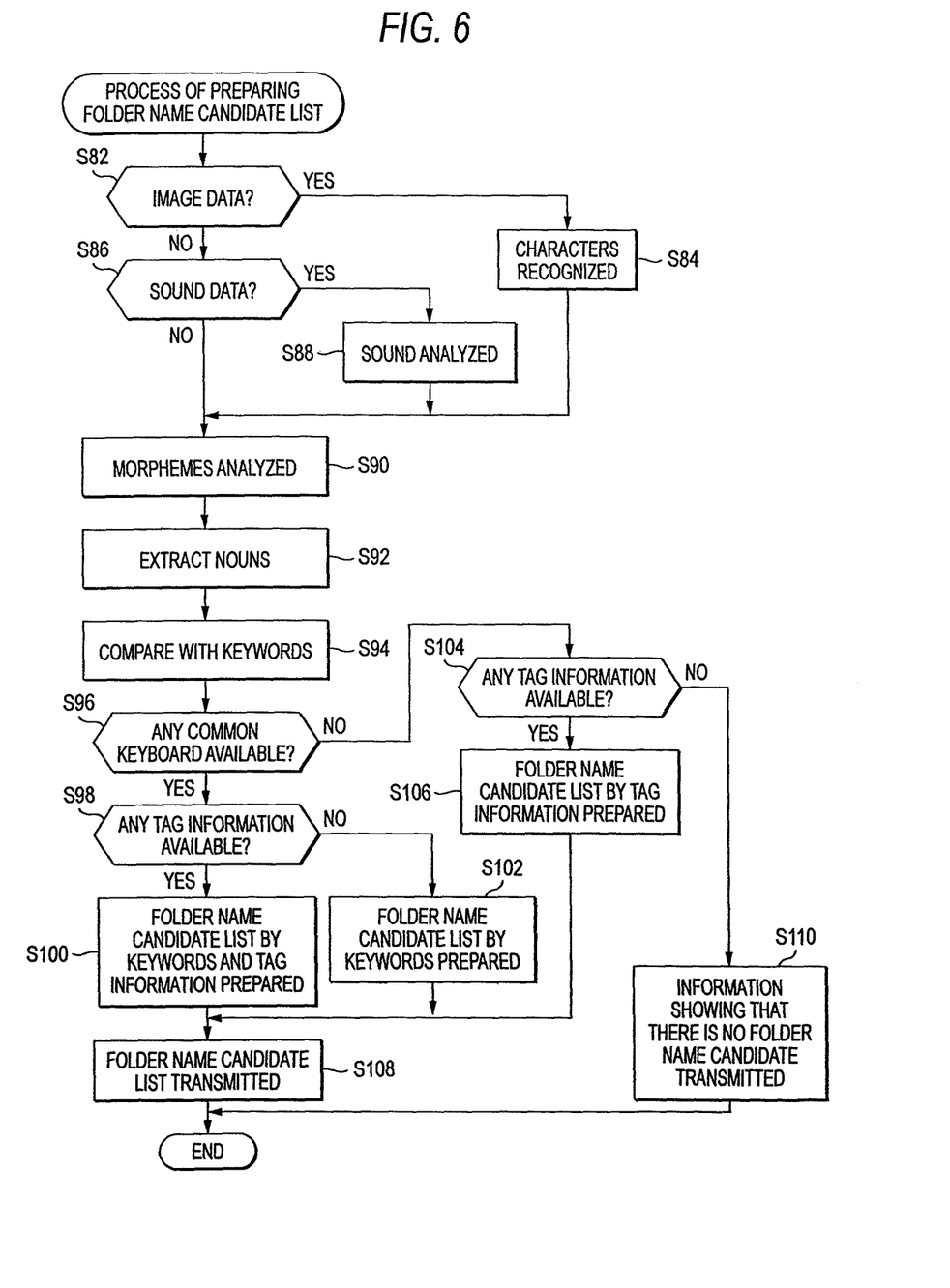
FIG. 6 is a flowchart showing a process for preparing a candidate list of folder names according to an exemplary embodiment of the present invention.

FIG. 6 is a flowchart showing a process of preparing a candidate list of folder names in operation S62, which is shown in FIG. 5. The controller 42 checks whether the data file received in operation S52 is composed of image data (S82). If the data file is composed of image data (YES in S82), the controller 42 executes character recognition by means of an Optical Character Reader (OCR) and converts the image data to text data (S84), and advances to operation S90. If the data file is not composed of image data (NO in S82), the controller 42 checks whether the data file is composed of sound data (S86). If the data file is composed of sound data (YES in S86), the controller 42 executes sound analysis, and converts sound data to text data (S88), and advances to operation S90. On the other hand, if the data file is not composed of sound data (NO in S86), the data file received in operation S52 will be composed of text data. In this case, the controller 42 advances to operation S90.

At operation S90, the controller 42 executes morpheme analysis with regard to the text data converted in operation S84 and/or operation S88, and/or the text data received in operation S52. The text data subjected to the morpheme analysis are divided morpheme by morpheme, and the word classes of the respective morphemes are specified.

The controller 42 extracts only the text belonging to nouns from the text data divided morpheme by morpheme by the morpheme analysis (S92). The controller 42 compares the texts extracted in operation S92 with the respective keywords of the keyword list 48 (S94), and determines if there is a keyword in common between the extracted texts and the respective keywords (S96). If there is a common keyword (YES in S96), the controller 42 checks whether tag information is added to the data file (S98). If tag information is added thereto (YES in S98), the controller 42 prepares a candidate list of folder names by combining the keyword determined in S96 with the tag information (S100), and advances to operation S108. On the other hand, if no tag information is added (NO in S98), the controller 42 prepares a candidate list of folder names according to the keyword specified in S96 (S102), and advances to operation S108. That is, if there is a common keyword but no tag information is added (YES in S96 but NO in S98), then the controller 42 prepares the candidate list of folder names based on the keyword from operation S96.

On the other hand, if there is no common keyword (NO in S96), the controller 42 checks whether tag information is added (S104). If tag information is added (YES in S104), the controller 42 prepares a candidate list of folder names based on the tag information (S106), and advances to operation S108. At operation S108, the controller 42 transmits the candidate list of folder names to the multi function device 20, and terminates the processing. On the other hand, if no tag information is added (NO in S104), the controller 42 transmits information to the multi function device 20 showing that there is no candidate for the folder name (S110), and terminates the processing.

A detailed description was given for the data storage apparatus 10 according to the exemplary embodiment. In the data storage apparatus 10, a candidate list of folder names is prepared based on a keyword included in the text data of a data file input in the multi function device 20. According to the data storage apparatus 10, it is possible to store a data file in a folder whose folder name is associated with the content of the input data file by selecting a keyword from a candidate list of folder names.

In the data storage apparatus 10 according to an exemplary embodiment of the present invention, a candidate list of folder names including tag information such as transmission source information, which is included in a data file transmitted from a peripheral (external) device such as a PC 50, is prepared. With the data storage apparatus 10, it is possible to store the data file in a folder, whose folder name is based on the tag information, by selecting the tag information from a candidate list of folder names.

In the data storage apparatus 10 according to an exemplary embodiment of the present invention, information on an input date and time of a data file is displayed as a folder name candidate. According to the data storage apparatus 10, it is possible to store a data file in a folder, whose folder name is based on the information on the input date and time, by selecting the information on the input date and time as the folder name.

In addition, in the data storage apparatus 10 according to an exemplary embodiment of the present invention, it is possible to input a folder name. Therefore, it is possible to input a desired folder name or information on the input date and time in the case in which there is no desired folder name in the candidate list of folder names.

Further, in the data storage apparatus 10 according to an exemplary embodiment of the present invention, the text data of the input data file are subjected to morpheme analysis. The controller 42 extracts only the texts of nouns, which are included in the input data file, and compares the texts of nouns with the respective keywords of the keyword list 48, and prepares a candidate list of folder names. According to this configuration, even if texts of other morphemes than nouns are common to any keyword in the keyword list 48, these texts are not listed in the candidate list of folder names. Accordingly, it is possible to prevent keywords which do not substantially become candidates of folder names from being listed in the candidate list of folder names. Therefore, it is possible to lessen an amount of time and effort in selecting a desired keyword from the candidate list of folder names.

(First Additional Exemplary Embodiment)

Figure 7:
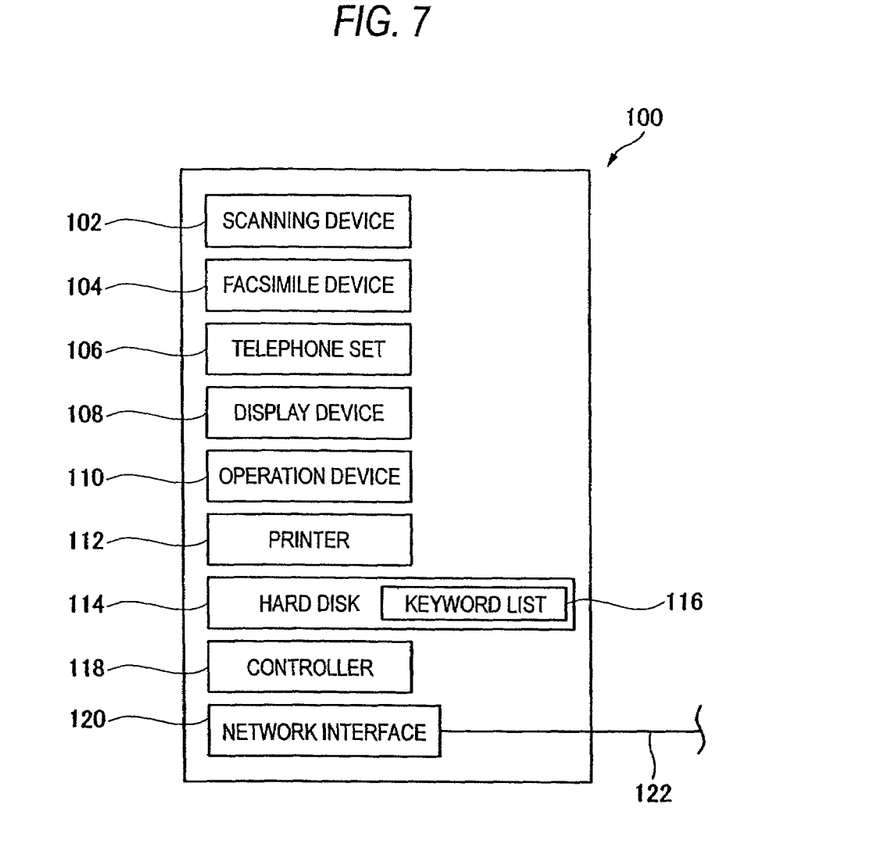
FIG. 7 is a view showing a configuration of a data storage apparatus according to another exemplary embodiment of the present invention.

In the data storage apparatus 10 described above, the multi function device 20 and the server 40 are separately composed. However, the multi function device 20 and the server 40 may alternatively be integrated with each other. FIG. 7 shows a configuration of a data storage apparatus 100 according to an additional exemplary embodiment of the present invention that is concurrently provided with the functions of the multi function device 20 and the server 40. The data storage apparatus 100 is provided with respective devices 102, 104, 106, 108, 110 and 112 that are similar to the respective devices 22, 24, 26, 28, 30, and 32 of the multi function device 20 described above. Further, the data storage apparatus 100 is provided with a hard disk 114 that concurrently includes the functions of the memory unit 34 of the multi function device 20 and those of the hard disk 44 of the server 40, and a controller 118 that concurrently includes the functions of the controller 36 of the multi function device 20 and those of the controller 42 of the server 40. The hard disk 114 stores a keyword list 116. Further, the data storage apparatus 100 includes a network interface 120. A network line 122 is connected to the network interface 120. The network line 122 may also be a wireless connection. The network line 122 is connected to a peripheral PC so that the peripheral PC and the data storage apparatus 100 can communicate via a hub and a router, etc.

The processing sequence that the controller 118 executes when the data storage apparatus 100 stores an input data file in a holder in the hard disk 114 can be achieved by adding some modification to the flowcharts shown in FIG. 4 through FIG. 6.

(Second Additional Exemplary Embodiment)

The hard disk 44 of the server 40 according to the exemplary embodiments described above may store a list of folder names in which all the folder names of folders existing in the hard disk 44 are recorded. However, alternatively, the controller 42 may transmit the list of folder names when the controller 42 transmits a candidate list of folder names to the multi function device 20 in operation S108 in FIG. 6 or when the controller 42 transmits information to the multi function device 20 at operation S110 showing that there is no candidate for the folder name.

The multi function device 20 may then distinguish and display a candidate list of folder names and a list of folder names when receiving the same.

(Third Additional Exemplary Embodiment)

The controller 36 of the multi function device 20 according to the exemplary embodiments described above executes processing in either one of the first mode or the second mode. However, if tag information is included in an input data file, the controller 36 may execute processing in a third mode. In the third mode, specified tag information (for example, information on a transmission source such as the fax number of a transmission source, address information of the transmission source, etc.) is automatically transmitted to the server 40 as a keyword. In the case of the third mode, when a data file is input in the multi function device 20, the controller 36 transmits an input data file to the server 40, and simultaneously transmits tag information to the server 40 as a keyword, and terminates the processing.

Therefore, as shown in FIG. 5, the processing becomes YES in operation S52 and in operation S54, and the controller 42 of the server 40 may store a data file in a folder for which the tag information is made into the folder name. In this case, it is possible to switch among the first mode, the second mode, and the third mode by operating the operation device 30.

As described in detail above, a data storage apparatus capable of storing data files in a folder is provided. The data storage apparatus is provided with a keyword storing unit, a data file inputting unit, a keyword specifying unit, a keyword outputting unit, a keyword selection permitting unit, and a data file storing unit. The keyword storing unit is able to store a plurality of keywords including at least one character. In addition, a plurality of keywords stored in the keyword storing unit may be input by a user or may be set as a default. The data file inputting unit inputs a data file.

Furthermore, the wording "data file" should be understood in the broadest sense, and has a concept including all the types of data. At the stage when a data file is input by the data file inputting unit, the "data file" may not necessarily be associated with any file name, but may be composed of data only. The keyword specifying unit specifies a keyword group including a keyword that is commonly included in both a plurality of keywords stored in the keyword storing unit and in the data file input by the data file inputting unit. The keyword outputting unit outputs the keyword group specified by the keyword specifying unit. The keyword selection permitting unit permits to select one keyword from the keyword group output by the keyword outputting unit. The data file storing unit stores the data file input by the data file inputting unit in a folder for which the keyword selected by the keyword selection permitting unit is made into the file name.

According to the data storage apparatus according to the exemplary embodiments described above, it is possible to provide the folder name associated with the content of the data file as a candidate of the storage destination of the data file. Thus, it is possible to store the data file in a folder by selecting the folder name from the candidates.

The above-described data storage apparatus may comprise one apparatus or may comprise two or more separate apparatuses. In the latter case, the data storage apparatus may be composed of an apparatus provided with at least one unit among the above units and another apparatus provided with the units other than the at least one unit. In this case, two or more apparatuses may be connected to each other so as to communicate with each other. For example, such a configuration may be accepted in which the first apparatus is provided with the data inputting unit, the keyword outputting unit and the keyword selection permitting unit, the second apparatus is provided with the keyword storing unit, the keyword specifying unit and the data file storing unit, and the first apparatus and the second apparatus are connected so as to communicate with each other. In such a case, the data storage apparatus includes both of the first apparatus and the second apparatus.

The data file inputting unit may receive data files transmitted from an external apparatus. If tag information is added to the data file received by the data file inputting unit, the keyword outputting unit may output the keyword group specified by the keyword specifying unit and tag information. If tag information is selected by the keyword selection permitting unit, the data file storing unit may store data files input by the data file inputting unit in the folder for which the tag information is made into the folder name. The tag information described above may be at least one of transmission source information, transmission subject, and transmission date information. The transmission date information may be only the date when transmitted or may be only the time when transmitted or may be both of transmitted date and time. For example, where the data file is an electronic mail, the address information of the transmission source, the transmission subject, and the transmission date and time may be added as the tag information. In addition, for example, if the data file is a data file received by facsimile, the fax number of the transmission source, name of the transmission source and transmission date and time may be added as the tag information. In the data storage apparatus, the keyword outputting unit outputs the tag information added to the data file as a candidate of the folder name. Thus, it is possible to select a folder name from the keyword group specified by the keyword specifying unit and tag information.

The data storage apparatus may be further provided with a mode selection permitting unit that permits selection of a mode. If the first mode is selected by the mode selection permitting unit, the keyword outputting unit may output a keyword group specified by the keyword specifying unit and tag information. If the second mode is selected by the mode selection permitting unit, the keyword outputting unit may output tag information without outputting the keyword group. In addition, if the second mode is selected, the keyword specifying unit may omit a process of specifying the keyword group. According to such a configuration, it is possible to shorten the time used from input of the data file to output of the keyword by selecting the second mode. This is because a process of specifying the keyword group may be omitted. This configuration is advantageous in a case in which a plurality of data files are input in a short time. For example, if a great deal of data files are input in a specified time band (for example, during the daytime on weekdays) and a small number of data files are input at other times, it is possible to select the second mode by the mode selection permitting unit for the specified time band described above. In this case, the keyword specifying unit does not specify the keyword group. Therefore, it is possible to shorten the time used from the input of the data file to the output of tag information by the keyword outputting unit. Accordingly, in the case in which data files are input one after another, the data files can be stored in a folder without wasting time for processing of one data file. On the other hand, at other times, it is possible to select the first mode. Therefore, in a time band in which data files are less often input, the keyword group may be output based on the content of the data file by setting to the first mode. In other words, the data storing apparatus may be set to operate in the various modes in various time bands.

The data storage apparatus may be further provided with a character input permitting unit for permitting to input at least one character. In this case, if any keyword is not selected by the keyword selection permitting unit but a character is input by the character input permitting unit, the data file storing unit may store a data file input by the data file inputting unit in a folder for which the character input by the character inputting unit is made into the folder name. With this configuration, it is possible to input a folder name in a case in which a keyword other than the keyword group output by the keyword outputting unit is made into the folder name.

The keyword storing unit may newly store tag information as the keyword in a case in which the tag information is selected by the keyword selection permitting unit. In addition, the keyword storing unit may newly store at least one character input by the character input permitting unit as the keyword. With this configuration, tag information not stored by the keyword storing unit and a character input by the input permitting unit are stored as the keyword. Therefore, it is possible to automatically update the storage content of the keyword storing unit.

The keyword outputting unit may further output information of input date and time pertaining to the date when a data file is input by the data file inputting unit. The information of input date and time may be only the input date or only the input time, or may be both the input date and time. In the case in which the information of input date and time is selected by the keyword selection permitting unit, the data file storing unit may store a data file input by the data file inputting unit in a folder for which the information of input date and time is made into the folder name. According to the data storage apparatus, it is possible to select the information of input date and time as the folder name.

The data inputting unit may enable inputting a data file composed of various types of data such as text data, sound data, image data, etc. In the case in which the data that compose a data file input by the data file inputting unit are sound data, the data storing apparatus may be further provided with a first converting unit configured to convert the corresponding sound data to text data. Then, the keyword specifying unit may specify a keyword group commonly included in both of a plurality of keywords stored in the keyword storing unit and the text data obtained by the first converting unit. In addition, in the case in which the data that compose a data file input by the data file inputting unit are image data, the data storing apparatus may be further provided with a second converting unit configured to convert the corresponding image data to text data. Then, the keyword specifying unit may specify a keyword group commonly included in both of the plurality of keywords stored in the keyword storing unit and the text data obtained by the second converting unit.

The data storage apparatus may be further provided with a morpheme analyzing unit configured to divide data, which compose a data file input by the data file inputting unit, into a plurality of morphemes. In this case, the keyword specifying unit may specify a keyword group commonly included in both of a plurality of morphemes obtained by the morpheme analyzing unit and a plurality of keywords stored in the keyword storing unit. With the configuration, even in a case in which the same character strings as the keywords stored in the keyword storing unit are included in a data file, if the character strings in respective morphemes differ from each other, the character strings are not specified as the keyword. For example, it is assumed that "dog" is stored in the keyword storing unit as a keyword. In a case in which there is a character string "walk with a dog" in the input data file, the character string is decomposed as [walk/with/a/dog] by the morpheme analyzing unit. The keyword specifying unit may specify [dog] (noun) as the keyword because the keyword storing unit stores [dog]. On the other hand, if there is a character string of "dog (verb) a workpiece" in the input data file, the character string is decomposed as [dog/a/workpiece] by the morpheme analyzing unit, the morpheme analyzing unit decomposes the character string as "dog" (verb), the keyword specifying unit does not specify [dog] (noun) as the keyword. According to the above described configuration, it is possible to prevent the character string, which is not substantially common to the keyword, from being specified by the keyword specifying unit. Accordingly, folder name selection work carried out by a user can be lessened.

According to another exemplary embodiment of the present invention, a computer readable medium storing a computer program to realize the data storage apparatus described above is provided. The computer program causes a computer, which is incorporated in the data storage apparatus capable of storing data files in a folder and simultaneously capable of storing a plurality of keywords including at least one character, to carry out the following processes:
(1) a data file inputting process for inputting a data file;
(2) a keyword specifying process for specifying a keyword group including a keyword that is commonly included in both of the plurality of keywords and the data file input by the data file inputting unit;
(3) a keyword outputting process for outputting the keyword group specified by the keyword specifying process; and
(4) a data file storing process for storing the data file input by the data file inputting process in a folder, for which the keyword is made into the folder name, where one keyword is selected from the keyword group output in the keyword outputting process.

A data storage apparatus according to an exemplary embodiment of the present invention may include a first apparatus (for example, a multi function device) including a data inputting unit, a keyword outputting unit, and a keyword selection permitting unit, and a second apparatus (for example, a server) including a keyword storing unit, a keyword specifying unit and a data file storing unit. The first apparatus and the second apparatus may be separately assembled.

The keyword specifying unit may specify a keyword group commonly existing between a plurality of morphemes being a noun among a plurality of morphemes obtained by a morpheme analyzing unit and a plurality of keywords stored in the keyword storing unit.

The data storage apparatus may have the following structures.
(1) A data file inputting unit configured to input a data file to which tag information is added. The tag information is at least one of transmission source information, subject, and information of transmission date and time.
(2) A tag information outputting unit configured to outputting the tag information described above.
(3) An information selection permitting unit configured to permit the selection of a type of information among the tag information output by the tag information outputting unit.
(4) A data file storing unit configured to store a data file input by the data file inputting unit in a folder for which the information selected by the information selection permitting unit is made into the folder name.

According to the data storage apparatus, it is possible to provide tag information which is added to the data file as candidates of the storage destinations of data files.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A data storage system, having one or more processors, comprising:
   a keyword storing unit configured to store a plurality of keywords including a character, the keywords relating to a folder name of a folder for storing a data file;
   a data file inputting unit configured to input a single data file;
   an operation portion configured to receive an operation; and
   a controller configured to perform, every time the single data file is input by the data file inputting unit, the following steps in this order:
   specifying a keyword that is commonly included in both the plurality of keywords stored in the keyword storing unit, and keywords included in the single data file input by the data file inputting unit outputting a plurality of folder names which are respectively associated with the specified keyword group;
   selecting one of the plurality of folder names among the plurality of output folder names unit based on the operation received by the operation portion; and
   storing the single data file in the folder which is generated before the single data file is input by the data file inputting unit and the folder name of which is selected.

2. The data storage system according to claim 1, wherein the data file inputting unit receives the data file transmitted from an external apparatus, the controller outputs the keyword group and tag information, if the tag information is added to the single data file received by the data file inputting unit, the tag information includes at least one of a transmission source, a transmission subject, and a transmission time, and the controller stores, if the tag information is selected by the controller, the single data file in a folder whose folder name is generated based on the tag information.

3. The data storage system according to claim 2, further comprising a mode selection unit configured to select a mode, wherein the controller outputs the keyword group and the tag information if a first mode is selected by the mode selection unit, and outputs tag information without outputting the keyword group if a second mode is selected by the mode selection unit.

4. The data storage system according to claim 3, wherein, if the second mode is selected by the mode selection unit, the controller does not specify the keyword group.

5. The data storage system according to claim 2, wherein the keyword storing unit newly stores the tag information as a keyword if the tag information is selected by the controller.

6. The data storage system according to claim 1, further comprising a character input unit configured to input a character, wherein the controller stores the single data file in a folder whose folder name is generated based on a character input by the character inputting unit if no keyword is selected by the controller and a character is input by the character input unit.

7. The data storage system according to claim 6, wherein the keyword storing unit newly stores as a keyword a character input by the character input unit.

8. The data storage system according to claim 1, wherein the keyword outputting unit further outputs information regarding a time at which the single data file is input by the data file inputting unit, and the controller stores the single data file in a folder whose folder name is generated based on of the time at which the data file is input if the time is selected by the controller.

9. The data storage system according to claim 1, further comprising a first converting unit configured to convert sound data to text data if data included in the single data file are sound data,
   wherein the controller specifies the keyword group including a keyword that is commonly included in both of the plurality of keywords and the text data obtained from the first converting unit.

10. The data storage system according to claim 1, further comprising a second converting unit configured to convert image data to text data if data included in the single data file are the image data,
    wherein the controller specifies the keyword group including a keyword that is commonly included in both of the plurality of keywords and the text data obtained by the second converting unit.

11. The data storage system according to claim 1, further comprising a morpheme analyzing unit configured to divide data, which are included in the single data file, into a plurality of morphemes,
    wherein the controller keyword specifying unit specifies the keyword group including a keyword that is commonly included in both of the plurality of keywords and the plurality of morphemes obtained by the morpheme analyzing unit.

12. The data storage system according to claim 1, wherein the controller comprises a display which outputs the specified keyword group.

13. A non-transitory computer readable medium storing a computer program which, when executed, performs:
    a data file inputting process for inputting a single data file;
    an operation receiving process for receiving an operation;
    a keyword specifying process for specifying a keyword group including a keyword that is commonly included in both of a plurality of stored keywords and keywords included in the single data file input by the data file inputting process;
    a keyword outputting process for outputting a plurality of folder names which are respectively associated with the keyword group specified by the keyword specifying process;
    a keyword selection process for selecting one of the plurality of folder names among the plurality of folder names output in the keyword outputting process based on the operation received in the operation process; and
    a data file storing process for storing the single data file in the folder on a memory, which is generated before the single data file is input by the data file inputting process and the folder name of which is selected,
    wherein every time the single data file is input by the data file inputting process, the keyword specifying process, the keyword outputting process, the keyword selection process and the data file storing process are performed in this order.

14. A data storage apparatus comprising:
    a hard drive which stores a plurality of keywords including a character, the keywords relating to a folder name of a folder for storing a data file;
    an input apparatus which is configured to input a single data file; and
    a controller which is configured to perform, every time the single data file is input by the input apparatus, the following steps in this order:
    specifying a keyword group including a keyword that is commonly included in both the plurality of keywords stored in the keyword storing unit, and keywords included in the single data file input by the data file inputting unit;
    outputting a plurality of folder names which are respectively associated with the specified keyword group;
    selecting one of the plurality of folder names among the plurality of output folder names based on an operation received by an operation portion; and
    storing the single data file in the folder which is generated before the single data file is input by the data file inputting unit and the folder name of which is selected.

15. The data storage apparatus according to claim 14, further comprising a display device and an operating device,
    wherein the controller displays the keyword group on the display device, and selects the keyword from the keyword group based on an input from the operating device.

16. The data storage apparatus according to claim 14, wherein the controller specifies a keyword group including a keyword that is included in both the plurality of keywords and keywords generated from a content of the single data file.

17. A data storage system, having one or more processors, comprising:
    a keyword storing unit configured to store a plurality of keywords including a character;
    a data file inputting unit configured to input a single data file;
    an operation portion configured to receive an operation; and
    a controller configured to perform, every time the single data file is input by the data file inputting unit, the following steps in this order:
    specifying a keyword group including a keyword that is commonly included in both the plurality of keywords stored in the keyword storing unit and keywords included in the single data file input by the data file inputting unit;

outputting a plurality of folder names which are respectively associated with the specified keyword group;

selecting one of the plurality of folder names among the plurality of output folder names based on the operation received by the operation portion;

determining whether the folder, the folder name of which is selected, exists; and generating a folder, the folder name of which is selected, and storing the single data file in the generated folder if it is determined that the folder, the folder name of which is selected, does not exist.

\* \* \* \* \*